Figure 1:
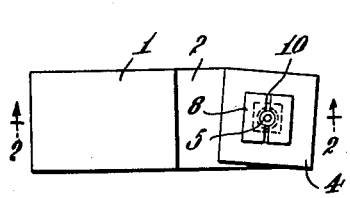

Feb. 25, 1964                T. V. WILLIAMS                3,121,939
                    CUTTING TOOL WITH INDEXABLE BIT
Original Filed Nov. 30, 1959                         3 Sheets-Sheet 1

INVENTOR.
Thurston V. Williams
BY
Roberts, Cushman & Grover
ATT'YS

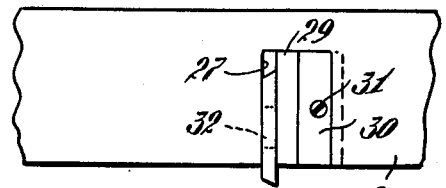
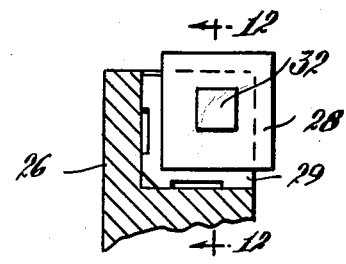
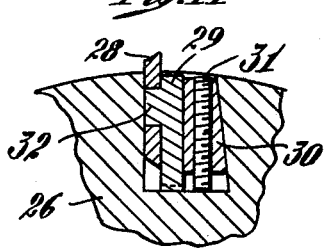
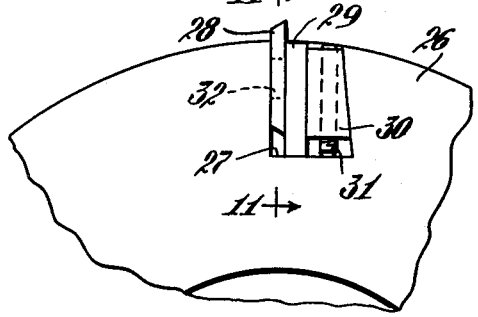
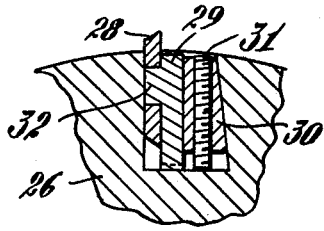
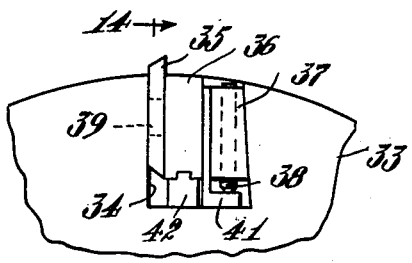
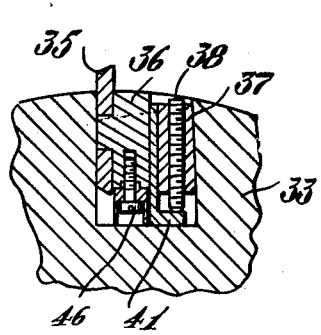
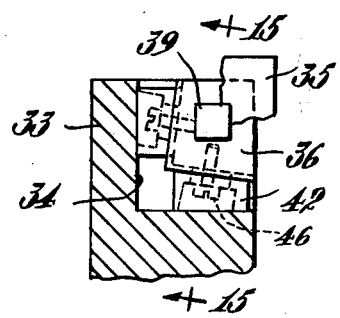
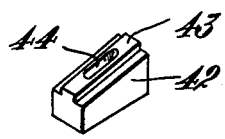

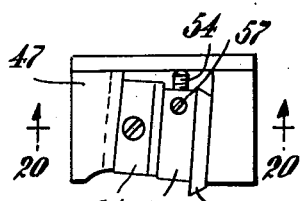
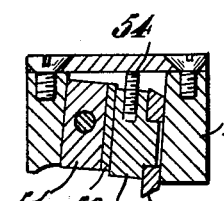
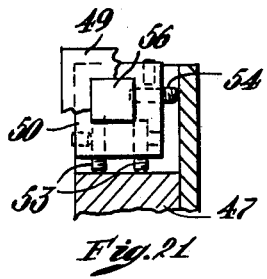
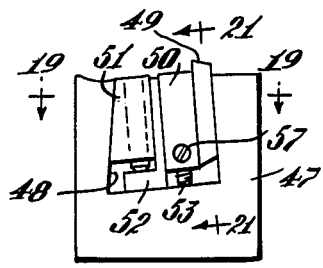
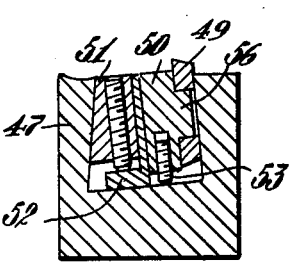
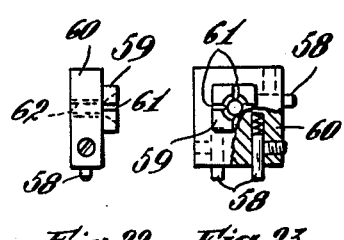
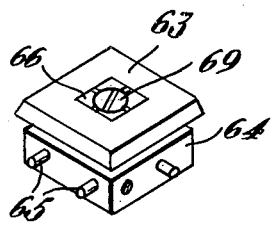
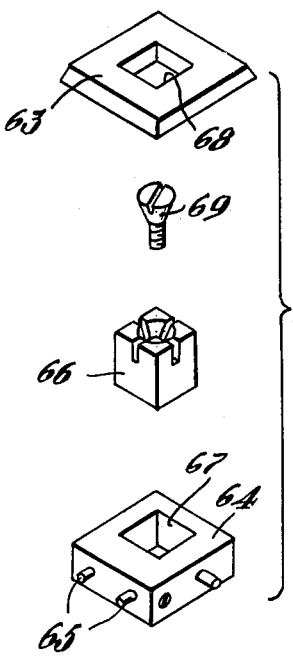

United States Patent Office 3,121,939
Patented Feb. 25, 1964

3,121,939
CUTTING TOOL WITH INDEXABLE BIT
Thurston V. Williams, Wilton, N.H.
(% The O.K. Tool Co. Inc., Milford, N.H.)
Original application Nov. 30, 1959, Ser. No. 856,174. Divided and this application Nov. 28, 1960, Ser. No. 72,061
7 Claims. (Cl. 29—96)

This invention relates to bits of the throw-away type which have a plurality of cutting points movable into cutting position successively as they become dull and which are intended to be thrown away after all of the cutting points have been used. While the invention is useful with any kind of a cutting bit such as lathe bits, milling cutters, etc., it is particularly applicable to metal cutting bits having carbide tips or the like.

Objects of the invention are to provide a bit which is simple and economical in construction, which can be applied to a wide variety of holders of different sizes and shapes, and which can be quickly indexed from one cutting position on the holder to another. Other objects are to provide a bit indexer by which the bit may be indexed to any one of a plurality of cutting positions.

According to the present invention the bit has an outer polygonal periphery providing a plurality of cutting points and a central opening providing an inner periphery which has the same polygonal shape as said outer periphery, whereby the bit may be indexed with said inner periphery to bring any of said points to the same cutting position. By indexing the bit by means of its inner periphery, instead of its outer periphery as is customary, the outer periphery of the bit need not contact the tool support at any point. The invention also involves a bit indexer comprising a support or base having a seat for the bit and a holder projecting from the seat and fitting said opening, the holder being non-rotatable relative to the support. Preferably the cross-section of the holder forms a regular polygon and the outer periphery of the bit has the same regular polygonal shape but preferably not the same size. The aforesaid holder may be fast to the support or detachable therefrom.

In a still more specific aspect the support or base has abutments on its periphery for engagement with a surface or surfaces in the recess of a body such as the rotary head of a face mill or the reciprocating bit carrier of an ordinary milling machine. Preferably the abutments are adjustable to vary the distance from the outer surfaces of the abutments and the aforesaid holder projecting from the bit seat. In the preferred embodiments the abutments comprise pins fitting in openings in the periphery of the aforesaid base or support. While the pins may be slidable in the openings and held in adjusted position by set screws, preferably they are threaded into their openings.

Figure 4:
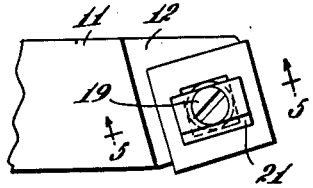
Figure 2:
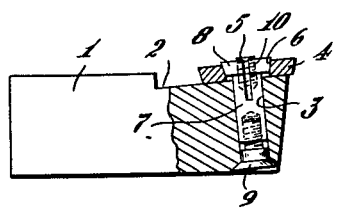
Figure 5:
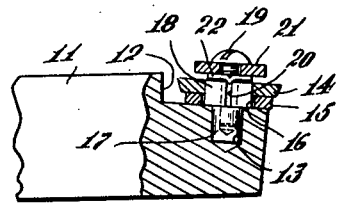
Figure 3:
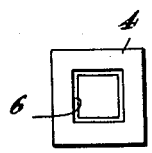
Figures 6, 7:
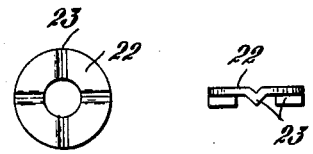
Figure 8:
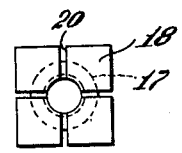

For the purpose of illustration typical embodiments of the invention are shown in the accompanying drawings in which FIG. 1 is a plan view of one embodiment;
FIG. 2 is a section on line 2—2 of FIG. 1;
FIG. 3 is a plan view of the bit shown in FIGS. 1 and 2;
FIG. 4 is a plan view of another embodiment;
FIG. 5 is a section on line 5—5 of FIG. 4;
FIG. 6 is a bottom plan view of the locator shown in FIG. 5;
FIG. 7 is a side view of the locator;
FIG. 8 is a top plan view of the holder shown in FIGS. 4 and 5;
FIG. 9 is a side view of another embodiment;
FIG. 10 is an end view of the same embodiment;
FIG. 11 is a section on line 11—11 of FIG. 10;
FIG. 12 is a section on line 12—12 of FIG. 11;
FIG. 13 is an end view of another embodiment;
FIG. 14 is a section on line 14—14 of FIG. 13;
FIG. 15 is a section on line 15—15 of FIG. 14;
FIG. 16 is an isometric view of one of the adjustable abutments shown in FIGS. 13, 14 and 15;
FIG. 17 is a side view of another embodiment;
FIG. 18 is an end view of the same embodiment;
FIG. 19 is a section on line 19—19 of FIG. 18;
FIG. 20 is a section on line 20—20 of FIG. 17;
FIG. 21 is a section on line 21—21 of FIG. 18;
FIG. 22 is a peripheral view of an indexer in which the adjustable abutments are sliding pins instead of threaded pins as in FIGS. 17 to 21;
FIG. 23 is a side view of the indexer shown in FIG. 22;
FIG. 24 is an exploded view of another modification; and
FIG. 25 is an assembled view of the modification shown in FIG. 24.

The particular embodiment of the invention shown in FIGS. 1, 2 and 3 comprises a support 1 which may be detachably mounted on a lathe or other machine in any well-known manner, the support having a flat bit seat 2. Extending through the support perpendicular to the plane of the seat 2 is an opening 3 which is square in cross-section. Resting on the seat 2 is a bit 4 having a square central opening 6, the inner and outer peripheries of the bit flaring upwardly as shown in FIG. 2. The bit is held on its seat by means of a holder 7 shaped to fit the opening 3 and having a head 8 shaped to fit the opening 6. The holder is held in position by means of a screw 9 threaded into its lower end. The upper end of the holder may be split as shown at 10 in order to grip the bit tightly and a cone-point set-screw 5 may be threaded into the split end of the holder. As shown in FIG. 3 the opening 6 may be lined with a layer of relatively soft metal so that the opening may be cut to size more easily than if the entire bit were made of hard material. With four sides as illustrated the bit may be used in any one of four positions. To shift from one position to another the screw 5 is loosened, the screw 9 is loosened enough to permit the holder to be lifted until its head 8 is above the bit, after which the bit may be turned to a new position.

The modification shown in FIGS. 4 to 8 comprises a support 11 having a seat 12 provided with a recess 13. Between the seat 12 and the bit 14 is a backing plate 15 having a central opening 16 corresponding to the opening in the bit 14. Fitted in the opening 13 is an indexer 17 having a head 18 fitting the openings in the bit 14 and backing plate 15. The plate 15 and indexer 17 are brazed or otherwise integrally secured to the body 11. The bit is held in position by means of a screw 19 threaded into the upper end of the holder. Between the head of the screw and the holder is a chip breaker 21 and a locator 22. As shown in FIGS. 6 and 7 the locator has four radial ridges 23 on its lower side which fit into slots 20 in the head 18 of the holder, thereby to spread the head of the holder tightly against the inner periphery of the bit 14. In the embodiment shown in FIGS. 4 to 8 the bit may be indexed to a new position by removing the screw 19, lifting the bit 14, chip breaker 21 and locator 22, turning the parts 90° and then replacing them.

The embodiment of FIGS. 9 to 12 is shown as applied to a rotary face or end mill comprising a circular body or head 26 having recesses 27 to receive the bits 28, indexers 29, wedges 30 and screws 31 for actuating the wedges. As before each indexer 29 has an integral holder 32 in the form of a square protuberance which fits into the square opening in the bit 28. The recess 27 tapers outwardly and the screw 31 seats on the bottom of the recess to force the wedge outwardly, thereby to clamp the parts in adjusted position. As shown in each of FIGS. 9 to 12, the indexer 29 projects beyond the periphery of the bit into engagement with the sides of the recess 27 on two sides, thereby to index the bit relatively to the body 26 independently of the periphery of the bit.

The embodiment shown in FIGS. 13 to 16 is like that shown in FIGS. 9 to 12 in that it comprises a rotary body 33 having recesses 34 containing bits 35, indexers 36, wedges 37 and screws 38 to actuate the wedges, the indexers 36 having integral holders 39 fitting into the square openings in the bit. However this embodiment differs in that it has an L-shaped member 41 interposed between the indexer and wedge with its base underlying the screw 38 so that the screw seats on the base of the L-shaped member instead of the bottom of the recess. This embodiment also differs in that the indexer abutments which project beyond the periphery of the bit are adjustable. These abutments comprise tapered blocks 42 having ribs 43 fitting in grooves in the periphery of the base 36 of the indexer. The blocks have slots 44 through which extend screws 46 which thread into the base 36. By loosening the screws the blocks may be shifted along the faces of th base, thereby to vary the distance between the outer surfaces of the abutments 42 and the periphery of the holder 39. Thus the extent to which the bit projects from the recesses 34 may be adjusted both axially and radially of the body 33.

The embodiment shown in FIGS. 17 to 21 is similar to that shown in FIGS. 13 to 16 in that it comprises a body 47 having a recess 48 to receive bit 49, indexer 50, wedge 51 and L-shaped member 52. However instead of the body 47 comprising a rotary head it comprises a block adapted to be mounted on a reciprocating carrier of a shaper, planer, slotter machine or the like. Moreover the abutments on the indexer comprise pins 53 and 54 which thread into openings in the periphery of the base of the indexer. By adjusting the pins 53 the extent to which the bit projects from one side of the recess 48 may be adjusted and by adjusting the pins 54 the extent to which the bit projects from the other side of the recess may be varied. As before each indexer 50 has an integral holder 56 fitting into the opening in the bit 49. If desired the adjusting screws 53 and 54 may be locked in position by means of set screws 57.

The modification shown in FIGS. 22 and 23 is like that shown in FIGS. 17 to 21 except in that the abutments are in the form of sliding pins 58 instead of threaded pins and the holder 59 of the indexer 60 is bifurcated as shown at 61 so that it can be expanded in the bit opening by means of a screw threaded into the opening 62.

The modification shown in FIGS. 24 and 25 is similar to those above described in that it comprises a bit 63, an indexer base 64 and adjustable abutment pins 65. However instead of the holder 66 being integral with the indexer base 64 it is a separate part which fits into an opening 67 in the base with its bifurcated end fitting in the bit opening 68. The bifurcated holder 66 is expanded to a tight fit in the openings 67 and 68 by means of a screw 69.

In the embodiments having adjustable pins (FIGS. 17–25) the indexer and bit may be adjusted angularly as well as in the two directions above described.

From the foregoing it will be evident that the holder of the indexer which fits into the bit opening may be either detachable from the indexer as in FIGS. 13 to 16 or fast to the base of the indexer as in the other figures. It will also be evident that the indexer abutments which project beyond the periphery of the bit may be either integral with the base of the indexer as in FIGS. 9 to 12 or adjustable relative to the base as in FIGS. 13 to 25. In any case the bit has an outer polygonal periphery providing a plurality of cutting points and a central opening providing an inner periphery which has the same polygonal shape as the outer periphery, so that the bit may be indexed with the inner periphery to bring any of its points to the same cutting position. Also each support or indexer has a seat for the bit and a holder projecting from the seat which fits into the bit opening, the holder being non-rotatable relative to the support.

It should be understood that the present disclosure is for the purpose of illustration only and that this invention includes all modifications and equivalents which fall within the scope of the appended claims.

This application is a division of my application Ser. No. 856,174 filed November 30, 1959, which is a continuation-in-part of my abandoned application Ser. No. 635,026, filed January 18, 1957 and allowed June 3, 1959.

I claim:

1. A device of the character referred to comprising a bit having an opening therein, a support having a seat for said bit, and a holder projecting from the support and fitting said opening, said holder being non-rotatable relative to the support, the outer periphery of the bit forming a polygon with a cutting point at each corner and both the holder and the inner periphery of the bit having the same polygonal shape as said outer periphery so that, by separating the bit and holder, the bit may be indexed to different positions in which its different cutting points are brought into the same cutting position respectively, the device having an empty space surrounding the outer periphery of the bit so that the bit is indexed solely by the holder and mutilation of the cutting edge of the bit does not interfere with accurate indexing.

2. The combination according to claim 1 characterized by abutments on said support periphery which are adjustable to vary the distance between said holder and the outer surface of the abutments.

3. The combination according to claim 2 wherein said abutments comprise pins fitting in openings in said support periphery.

4. For holding a bit having an outer polygonal periphery and having a central opening providing an inner periphery which has the same polygonal shape as said outer periphery, a bit indexer comprising a base having a polygonal periphery with a plurality of corners and, projecting from one side of the base, a holder having the same polygonal shape, the holder being non-rotatable relative to the base.

5. A bit indexer according to claim 4 wherein the holder is integral with the base.

6. A bit indexer according to claim 4 characterized by abutments on said periphery which are adjustable to vary the distance between said holder and the outer surface of the abutments.

7. A bit indexer according to claim 6 wherein said abutments comprise pins fitting in openings in said periphery.

(References on following page)

References Cited in the file of this patent

UNITED STATES PATENTS

| | | |
|---|---|---|
| 881,691 | Hughes | Mar. 10, 1908 |
| 1,460,030 | Mattson | July 26, 1923 |
| 1,565,656 | Leggott | Dec. 15, 1925 |
| 2,118,872 | Weimer | May 31, 1938 |
| 2,289,344 | Cedarleaf | July 14, 1942 |
| 2,378,094 | Nunes-Vaz | June 12, 1945 |
| 2,382,106 | Schoeppner | Aug. 14, 1945 |
| 2,598,581 | McKenna | May 27, 1952 |
| 2,625,068 | Smith | Jan. 13, 1953 |
| 2,645,003 | Thompson | July 14, 1953 |
| 2,664,617 | Kralowetz | Jan. 5, 1954 |
| 2,751,663 | Leuginger | June 26, 1956 |
| 2,870,523 | Richard | Jan. 27, 1959 |
| 2,946,245 | Yogus | July 26, 1960 |

FOREIGN PATENTS

| | | |
|---|---|---|
| 140,010 | Great Britain | Mar. 18, 1920 |
| 603,968 | Great Britain | June 25, 1948 |